United States Patent [19]

Lowell et al.

[11] 4,187,531
[45] Feb. 5, 1980

[54] LIGHTING ARRANGEMENT FOR PHOTOGRAPHIC WORK INCLUDING COMBINED SPOT AND FLOOD LIGHT LUMINAIRE

[76] Inventors: Ross Lowell, P.O. Box 114, Lincolndale, N.Y. 10540; Marvin H. Seligman, 1203 River Rd., Edgewater, N.J. 07020

[21] Appl. No.: 899,854

[22] Filed: Apr. 25, 1978

[51] Int. Cl.² .............................................. G03B 15/02
[52] U.S. Cl. ........................................ 362/17; 362/18; 362/283; 362/310; 362/322; 362/396
[58] Field of Search ..................... 362/16, 17, 18, 410, 362/396, 310, 431, 322, 283

[56] References Cited

U.S. PATENT DOCUMENTS 3,851,164  11/1974  Intrator ................................. 362/18

Primary Examiner—Stephen J. Lechert, Jr.
Attorney, Agent, or Firm—McGlew and Tuttle

[57] ABSTRACT

A luminaire includes a rectangular casing having side walls extending forwardly from a rear wall. A hand grip is adjustably secured to one side wall so that the casing can be held in one hand of a user, and a shaft is rotatably mounted in the casing and projects outwardly through such one side wall. A handle is secured to the projecting end of the shaft, adjacent the hand grip. A lamp socket is mounted on the shaft intermediate its ends and a lamp is mounted upright in the socket. A reflector assembly is interchangeably mounted in the casing and includes a small diameter inner parabolic reflector, a large diameter outer parabolic reflector coaxial with the inner reflector, and a transition zone interconnecting the reflectors. The reflector assembly has a relative elongated slot therein receiving the lamp socket for swinging of the upright lamp, about the axis of the shaft by operation of the handle, between an inner position, in which the lamp, in cooperation with the inner parabolic reflector, provides a "broad" or "wide angle" flood light, and an outer position in which the lamp, in cooperation with the inner and outer parabolic reflectors, which have different focal lengths, provides a concentrated spot light.

12 Claims, 11 Drawing Figures

LIGHTING ARRANGEMENT FOR PHOTOGRAPHIC WORK INCLUDING COMBINED SPOT AND FLOOD LIGHT LUMINAIRE

FIELD OF THE INVENTION

This invention relates to lighting arrangements for photographic work and, more particularly, to a novel lighting arrangement including a novel luminaire, arranged to be held in one hand or mounted on a support, and including a lamp bulb and reflector assembly easily continuously adjustable to positions providing either a concentrated spot light or a broad or wide angle flood light, or to any intermediate position.

BACKGROUND OF THE INVENTION

As mentioned in U.S. Pat. No. 3,852,582, issued Dec. 3, 1974 to Ross Lowell, proper lighting is of the greatest importance in professional photography, with respect to still pictures, television, and motion pictures, and the quantity and quality of the lighting are equally important. Mood or dramatic effects are dependent upon the light source, its size, its angle, and control devices. While well-equipped studios usually are provided with a variety of light equipment, including luminaires, control devices and mounting means, these tend to be cumbersome as they usually have only a single function. However, when a photographer must take still or motion picture "interiors" away from a studio, a problem is presented due to the necessity of transporting heavy and bulky lighting equipment to frequently distant or inaccessible locations.

In many situations, and depending upon the subject being photographed, either for still pictures, television or moving pictures, it may be required to illuminate the subject with either a concentrated "hard" or spot light or with a diffused "soft" or flood light, and in many instances both types of lighting must be used in a particular sequence of pictures. This does not present too much of a problem in studio work, but, on location work, a problem is presented in that the photographer must exchange a hard or spot light luminaire for a soft or flood light luminaire, either when hand-held or when mounted on a suitable support. Such interchange requires considerable time, which is of importance when it is considered that the speed of set-up is important, because of crew size and expense, as well as the impatience of personalities being photographed and inflexible schedules. Furthermore, it is usually necessary to use various photographic accessories, such as reflectors, barn doors, umbrellas, gels, and the like with both flood lights and spot lights, which again present a considerable problem to a photographer working at location away from a studio as well as a photographer working in a studio. As a result, there has been a long-felt need for an efficient spot light and flood light arrangement which can be easily transported, is versatile, and is readily adaptable to existing conditions at a chosen location, as well as a long-felt need for such a lighting equipment or lighting arrangement which can be readily used with conventional power supplies usually provided in photographic work and which has a great deal of flexibility with respect to the arrangement of the various components in order to provide full control for dramatic lighting, soft lighting or a variety of other effects.

SUMMARY OF THE INVENTION

In accordance with the present invention, this problem is solved by providing an exceptionally compact luminaire including a reflector assembly comprising a small diameter inner parabolic reflector and a large diameter outer parabolic reflector coaxial with the inner reflector, and by further providing an upright lamp mounted in a socket extending through a slot in the reflector assembly and pivotal between an inner position in which, in association with the inner reflector, the lamp provides a broad or wide angle flood light, and an outer position, in which the lamp, in cooperation with the inner and outer reflectors, provides a concentrated spot light, the luminaire being arranged to be held in one hand by means of a hand grip and an operating handle for pivoting the lamp between its two positions being provided adjacent the hand grip so that the lamp may be pivoted by the thumb of the same hand holding the hand grip. Thus, a photographer holding the luminaire in one hand, can readily change the lighting from a concentrated spot light to a broad or wide angle flood light by merely using the thumb of the hand holding the luminaire to pivot the lamp between its two positions.

More specifically, the luminaire, forming the principal component of the present invention, includes a substantially square casing having side walls extending forwardly from a rear wall, and a hand grip adjustably secured to one side wall whereby the casing can be held in one hand of a user, the hand grip, for storage, being foldable against the casing. A shaft is rotatably mounted to extend through a pair of opposite side walls and project outwardly of the side wall on which the hand grip is mounted, and a knob is secured to the projecting end of the shaft adjacent the hand grip. A lamp socket is mounted on the shaft intermediate its ends, and a lamp is mounted upright in the socket. Thus, in each of its two positions, the lamp extends upright rather than axially of the reflector assembly, and this is an important feature of the present invention.

A further feature of the invention is that the luminaire is completely compatible with the various accessories of the lighting arrangements shown and described in the above-mentioned U.S. Pat. No. 3,852,582. For this purpose, a tubular bracket, identical with the bracket 55 shown more particularly in FIGS. 5, 10 and 11 of U.S. Pat. No. 3,852,582 is pivotally mounted on a side wall of the luminaire casing. Additionally, a further bracket is pivotally mounted on the rear wall of the luminaire casing, for swinging to various adjusted positions, and is arranged to have mounted therein, for example, as umbrella of the type shown at 100 in FIG. 14 of U.S. Pat. No. 3,852,582. By virtue of the provision of the tubular bracket, the combined spot light and flood light luminaire of the invention, in addition to being hand-held, may be mounted on a suitable support, such an upright post, and may have various other accessories mounted in association therewith, all as disclosed, for example, in U.S. Pat. No. 3,852,582.

A rectangular barn door frame can be slipped onto the luminaire casing, and has mounted thereon, four barn doors or leaves, with each leaf comprising three sections for more precise light control to cooperate with other doors in various configurations. Each barn door can be easily removed from the barn door frame by a quick-release quarter-turn fastener. The barn door frame additionally serves as an accessory holder allowing two accessories to be used at the same time.

The luminaire is arranged to be operated at several voltages standard with photographic equipment, such as the usual 120 volt a.c. supply, a 240 volt a.c. supply, or a 30 volt d.c. supply, the only requirement being to select the lamp to be mounted in the socket in accordance with the particular voltage or source to which the luminaire is connected.

The reflector assembly is interchangeably mounted in the luminaire casing. Thus, the reflector useable with the 120 and 240 volt sources and the corresponding lamps has regular peening. Another reflector, interchangeable with the reflector just mentioned, is operable with a 30 volt d.c. battery source, and has oval peening on an intermediate surface and circular peening on an outer surface. Furthermore, a single parabolic reflector may also be mounted in the luminaire casing, this reflector having no peening and providing an optimum spot light effect, being used primarily for spot lighting and long throws of high intensity. For a "warming" effect, a gold reflector, similar to the reflector first mentioned, can be interchangeably mounted in the luminaire casing. The reflectors are designed to obtain the best spot-to-flood ratio and the best smoothness in transition between flood lighting and spot lighting despite lamp (bulb) filament configurations, and, to a large extent, such transition is substantially imperceptible.

Furthermore, various types of filters can be interchangeably mounted on the luminaire, depending upon the effect desired.

Another object of the invention is to provide an improved lighting arrangement, including a novel luminaire readily adjustable with one hand to provide either a concentrated "hard" or spot light or a "soft" broad or wide angle flood light.

Another object of the invention is to provide such a lighting arrangement and luminaire with which a plurality of photographic accessories can easily be used, by mounting on the luminaire or on elements associated therewith.

A further object of the invention is to provide such a lighting arrangement and luminaire which can either be held in one hand, with one hand adjustment thereof between the hard or spot light and the flood light position, or can be mounted on a suitable support by a bracket providing for mounting of additional accessories or another luminaire in association with the first luminaire.

For an understanding of the principles of the invention, reference is made to the following description of a typical embodiment thereof as illustrated in the accompanying drawings.

DESCRIPTION OF THE PREFERRED EMBODIMENT

Figure 1:
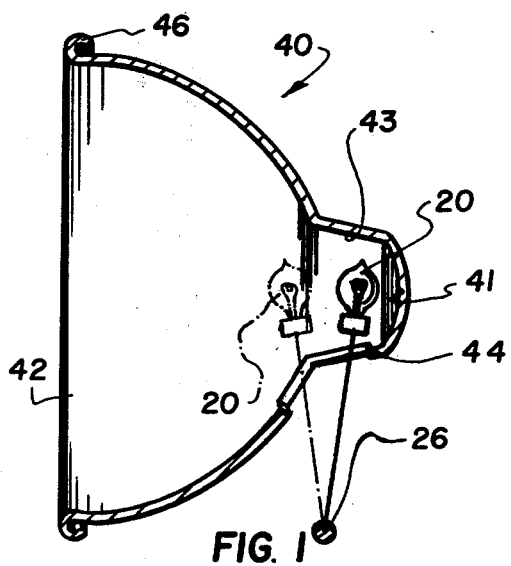
FIG. 1 is a somewhat schematic substantially axial and vertical section through the reflector assembly and associated lamp of the luminaire.
Figure 3:
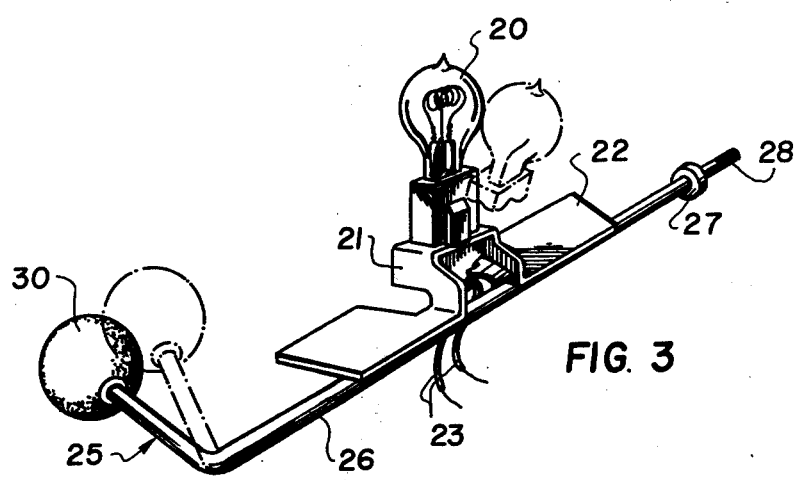
FIG. 3 is a perspective view of the lamp, its socket, the shaft mounting the lamp socket, and the operating handle for pivoting the lamp, the lamp and handle being shown in solid lines in the flood light position and in broken lines in the spot light position.
Figure 4:
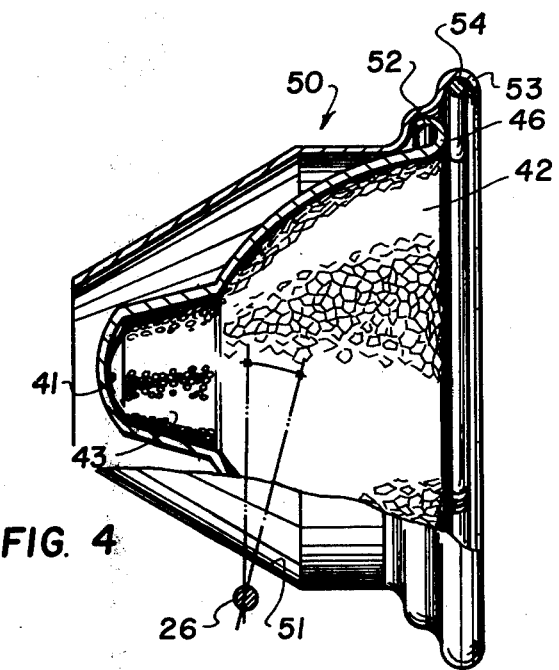
FIG. 4 is a side elevation view, partly in section, of a portion of a luminaire casing with the reflector assembly mounted therein and with the two lamp positions being indicated by the dash and double dot lines.

Referring first to FIGS. 1, 3, and 4, the principal feature of the luminaire, generally indicated at 10, is the provision of an upright lamp 20 in association with a reflector assembly 40, the lamp 20 being swingable between a solid line position, shown in FIG. 1, in which, in combination with the reflector assembly, it provides a broad or wide angle flood light, and a broken line position, shown in FIG. 1, in which, in combination with the reflector assembly, it provides a concentrated spot light. For this purpose, the reflector assembly 40 comprises a relatively small diameter inner parabolic reflector 41, a relatively large diameter outer parabolic reflector 42 coaxial with reflector 41, and a transition zone 43 coaxial with both reflectors. A slot 44 is provided in assembly 40, whereby lamp 20 may be swung between the solid line and broken line position of FIG. 1 about the axis of shaft 26, while the lamp 20 remains upright.

Figure 11:
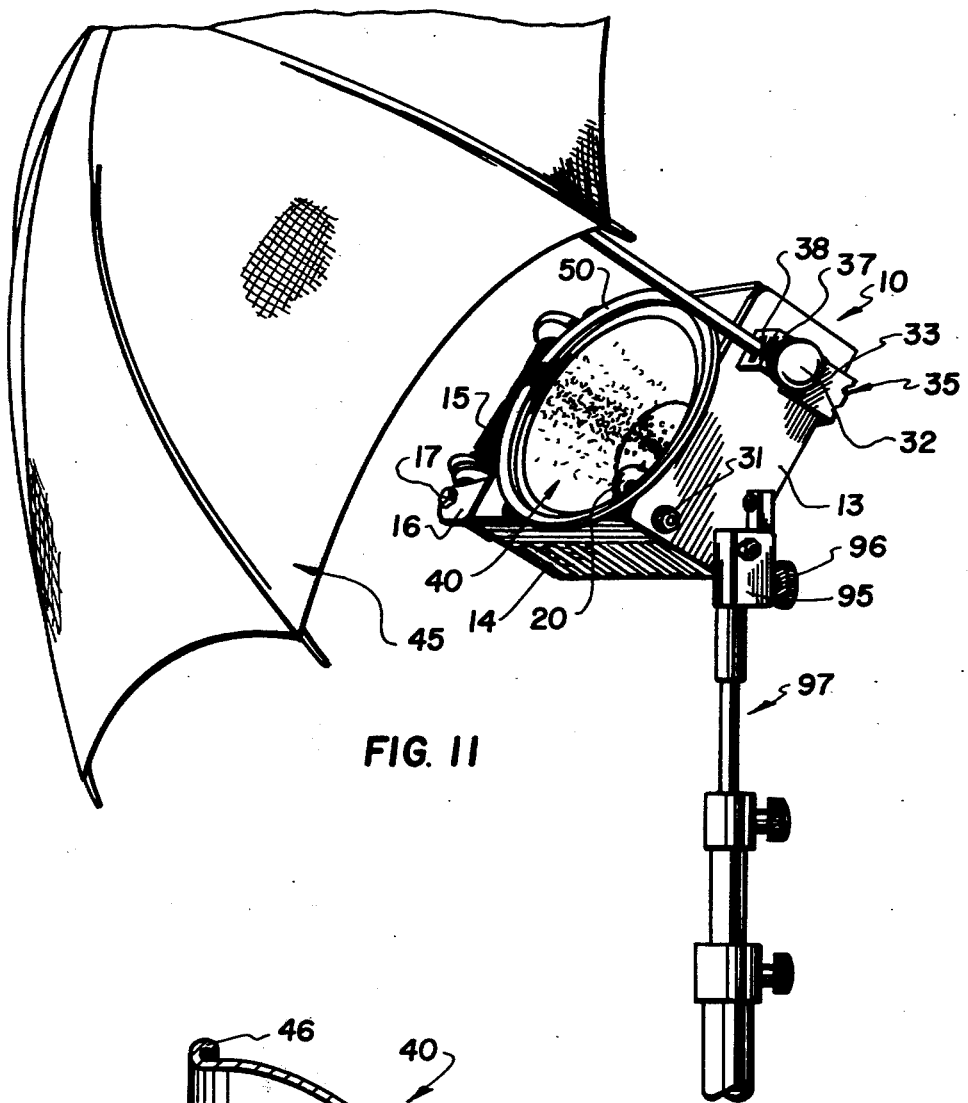
FIG. 11 is a perspective view illustrating the luminaire with an umbrella mounted thereon, the luminaire being mounted on a suitable supporting post.
Figure 2:
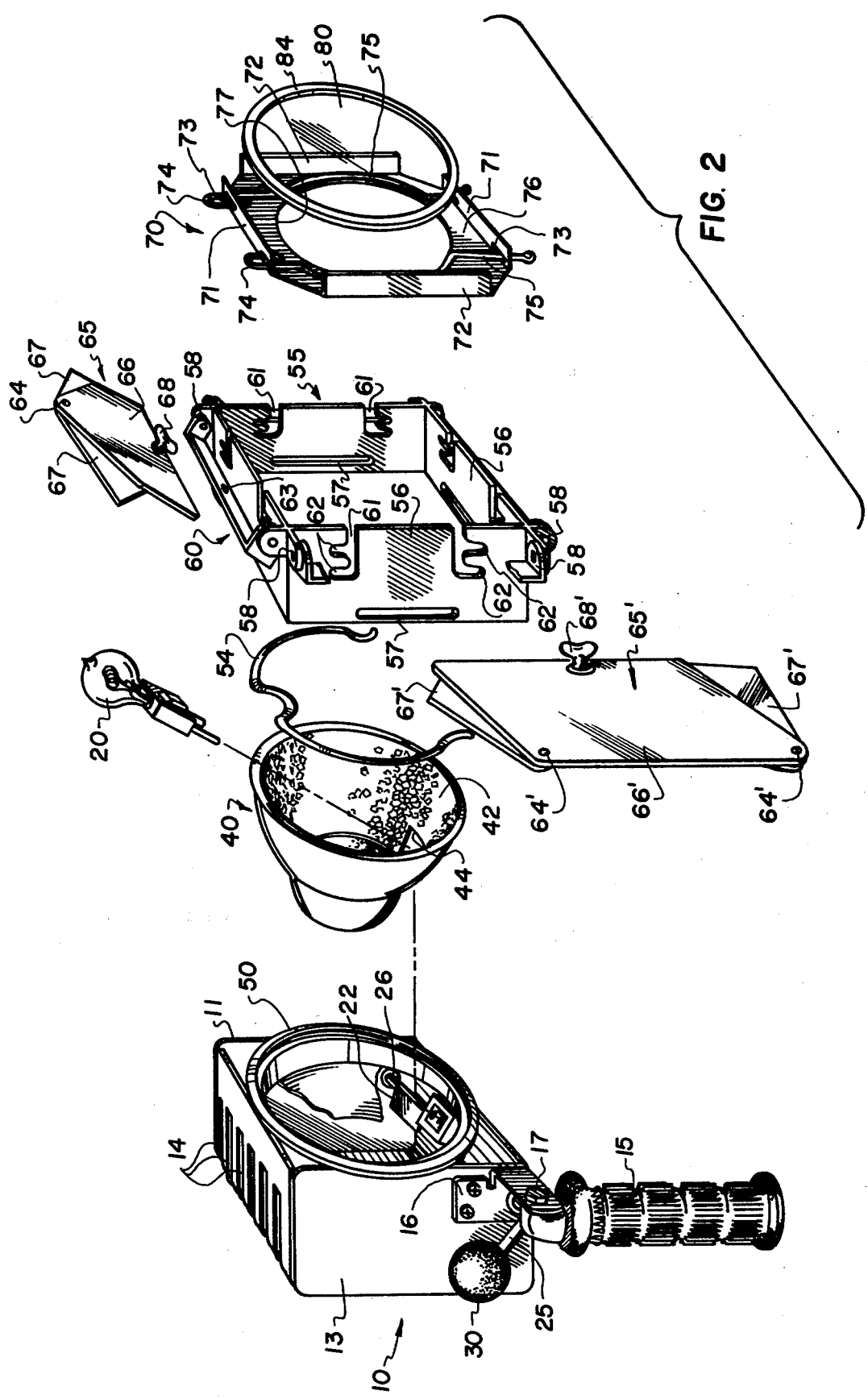
FIG. 2 is an exploded perspective view illustrating the luminaire, an associated barn door assembly, and an associated filter assembly.
Figure 8:
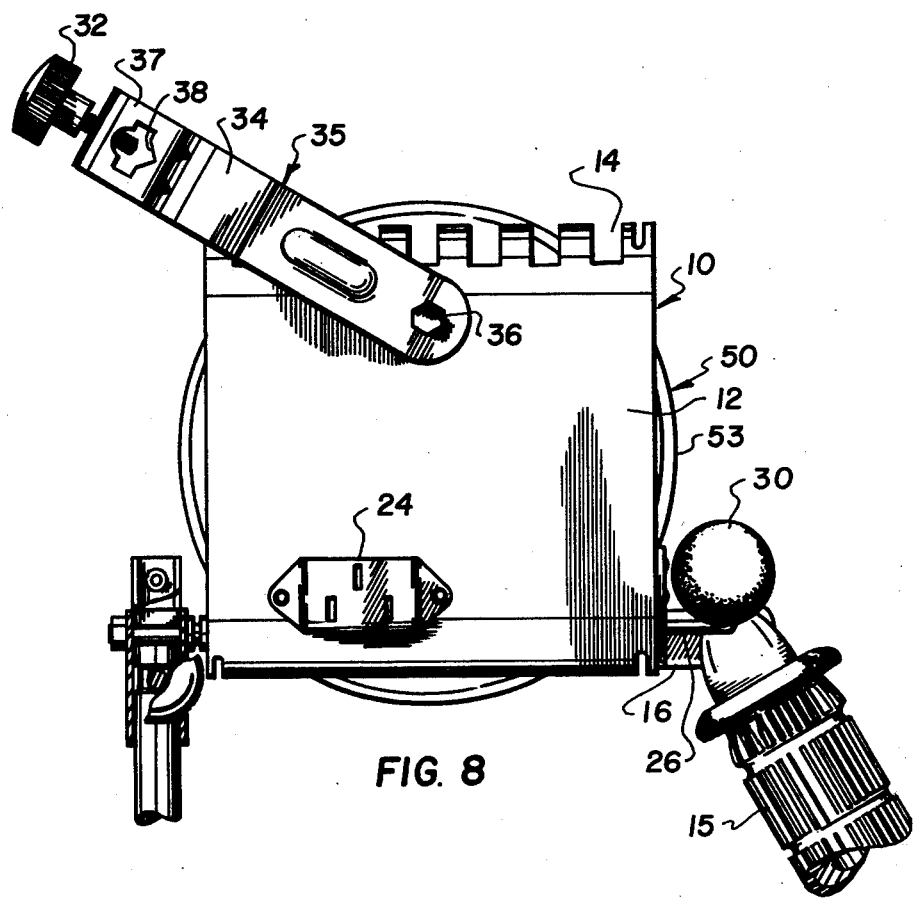
FIG. 8 is a rear elevation view, partly in section, of the luminaire and illustrating the bracket for mounting the luminaire on a suitable support.

As best seen in FIGS. 2, 8, and 11, the luminaire 10 comprises a metal casing 11, generally rectangular in form, including a rear wall 12 having side walls 13 extending forwardly therefrom and perpendicular thereto, the upper and lower side walls being formed with vents 14 for cooling of the lamp casing 11.

A hand grip 15 is pivotally mounted on a bracket 16 for pivoting about a pivot 17 between an operative position, shown in FIG. 2, and a retracted position, shown in FIG. 11.

Referring to FIG. 3, lamp 20 is disengageably mounted in a socket 21 secured on the mounting bracket and light baffle 22, in turn secured on a lamp shaft 26 extending between a pair of facing side walls. Leads 23 connect socket 21 to a receptacle 24 secured to rear wall 12, as best seen in FIG. 8. Lamp shaft 26 has a locating collar 27 thereon, and a threaded end 28 projects through one side wall and has a nut 31 secured thereon. The opposite end of lamp shaft 26 extends through the same side wall on which is mounted the hand grip 15, and is bent to form a handle 25 having a knob 30 on its free end. Knob 30 may be operated by a thumb of the same hand which grasps the hand grip 15, so that one hand switching between a spot light position and a flood light position, of lamp 20, can be readily effected.

When lamp 20 is in the solid line position shown in FIG. 1, it cooperates with inner parabolic reflector 41, for minimum intensity, to provide a broad or wide angle flood light. When lamp 20 is in such solid line rearward position, reflector 41 is "defocused" so that, relative to lamp 20, it no longer works as a parabolic reflector. When lamp 20 is swung to the dotted line position of FIG. 1 by operation of handle 25 through knob 30, it cooperates with inner parabolic relfector 41 and with outer parabolic reflector 42 to provide a concentrated spot light. In both positions, lamp 20 is substantially upright and is swung between its two different positions, rather than being longitudinally or axially displaced therebetween.

As best seen in FIGS. 8 and 11, an accessory mounting bracket 35 is pivoted, at one end, to the rear wall 12 of casing 11, as by a bolt 36. Bracket 35 has a main arm 34 extending substantially parallel to rear wall 12, and a second arm 33 bent at right angles to arm 34 and terminating in a channel-shape offset 37 formed with slots 38 for receiving mounting arms of accessories, such as the stem of an umbrella 45 shown in FIG. 11. A clamping knob 32 is threaded into channel offset 37 for clamping the stem of umbrella 45 or a similar elongated rod-like element of a photographic accessory, in position. While bracket 35 is shown, in FIG. 11, as mounting an umbrella 45, it may also be used to mount other accessories such as the gel frame 75, or the flag 70, shown in U.S. Pat. No. 3,852,582, the luminaire of the present invention being fully compatible with the various photographic accessories shown in U.S. Pat. No. 3,852,582.

For interchangeably mounting various reflector assemblies 40 in casing 11 of luminaire 10, a reflector assembly retainer, or inner housing, 50 is suitably secured in casing 11, this retainer being best shown in FIGS. 1 and 4. Retainer 50 is formed with a relatively large slot 51 through which socket 21 can extend into the slot 44 of reflector assembly 40. Retainer 50 is further formed with an annular shoulder 52 and, outwardly thereof, with a lip 53. Reflector assembly 40 is mounted in reflector assembly retainer 50 by engagement of rim 46 on reflector assembly 40 against the shoulder 52, and is retained in position by a retainer ring 54 releasably engaged in lip 53 of retainer 50. By the provision of the open-ended retainer ring 54, the reflector assemblies may be easily interchanged as desired. It will be noted, particularly from FIGS. 2, 8 and 11, that the lip or rim 53 of reflector assembly retainer 50 partially projects outwardly of the side walls 13 of casing 11 of luminaire 10, and the function of these projecting portions will be explained hereinafter.

Luminaire 10, and particularly lamp casing 11, is arranged to have mounted thereon a four-leaf barn door assembly with each leaf having three sections for more precise light control. Referring more particularly to FIG. 2, the barn door includes a substantially square frame 55 of relatively thin and resilient metal having four side walls 56 each formed with a respective elongated slot 57 adjacent its rear edge. By virtue of slots 57, the barn door frame 55 may be snapped over lip or rim 53 of reflector assembly retainer 50, so that the barn door frame can be rotated through 360° about the axis of retainer 50. At each end, and adjacent its forward edge, each wall 56 is formed with an upstanding apertured ear 58 receiving a pivot pin for a respective barn door bracket 60 which has an elongated channel shape and is formed with an aperture 63 intermediate its ends. Furthermore, and for a purpose to be described, the front edge of each side wall has extending inwardly therefrom a pair of symmetrically spaced slots 61 having opening thereinto a respective pair of notches 62.

Brackets 60 are arranged to have mounted thereon the barn doors indicated at 65 and 65'. Barn door 65 comprises a center leaf 66 having pivoted thereto, as at 64, two side leaves 67. The barn door leaf 66 has a combination rectangular and triangular configuration, whereas the barn door leaves 67 are triangular. By virtue of the three leaves, the effective area of the barn door may be readily varied as desired and, by virtue of the pivoted bracket 60, the barn doors may be adjusted at any desired angle. Each barn door 65 is secured to a bracket 60 by a quick-acting fastener 68 requiring only one quarter of a turn for engagement and disengagement.

The barn door 65' also includes three leaves, including a rectangular center leaf 66' and triangular side leaves 67' each pivoted, as at 64' to one corner of leaf 66', leaf 66' also being provided with a quick-acting fastener 68'. Either type of barn door, or both types, as desired, can be used with the barn door frame 55, the barn door 65 being readily interchangeable with the barn door 65', and vice versa.

Barn door frame 55 is designed to operate as a mounting for various accessories such as, for example, the filter frame 70 shown in FIG. 2. Referring to FIG. 2 filter frame 70 has a planar back wall 76, which is preferably square, with bevelled corners, and which is formed with a central circular opening 77. Wall 76 has top and bottom flanges 71 extending perpendicularly forwardly therefrom, and side flanges 72, also extending perpendicularly forwardly therefrom. Each flange 71 is formed, near its ends, with a pair of elongated slots 73. The slots 73 in the top flange 71 closely embrace bent ends 74 of spring arms 75 having free ends extending through the slots 73 in the lower flange 71.

Filter frame 70 can be mounted in barn door frame 55 by engaging bent ends 74 of spring arms 75 in the notches 62 of any wall of barn door frame 55. The free ends of spring 75 are then squeezed toward each other so that these arms can be engaged in the slots 61 in the opposite wall of barn door frame 55 and then allowed to spring outwardly into the selected notch 62. Barn door frame 55, and particularly its slots 61 and notches 62, can also be used to mount additional accessories, including, for example, a snoot on which there may be mounted a second barn door frame also adapted to mounting other accessories. Standard accessories for mounting on barn door frame 55 include scrims, dichroics, safety glass, cookalorises, snoots, and the like.

Figure 5:
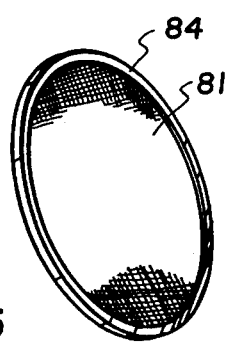
FIGS. 5, 6, and 7 are perspective views of three different filters which may be used with the luminaire.
Figure 6:
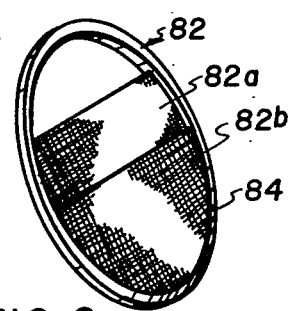
Figure 7:
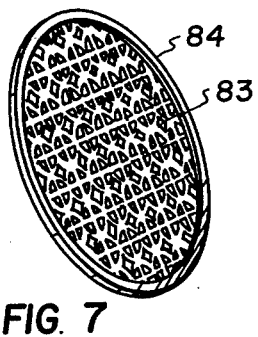

In addition to being able to interchangeably mount glass filters 80 of various types and various colors, filter frame 70 can also be used to mount various scrims, such as shown in FIGS. 5, 6, and 7. Each of the scrims shown in FIGS. 5, 6 and 7, in the same manner as the filter 80 shown in FIG. 2, has a circular rim 84. FIG. 5 illustrates a scrim 81 in the form of a relatively fine mesh screen. FIG. 6 shows a scrim 82 having a first screen section 82a extending through a major portion of the circular area defined by rim 84, and a second section 82b which is in the form of a segment, the two sections 82a and 82b being of relatively fine mesh screen, and section 82b being adjustable relative to section 82a. FIG. 7 illustrates a scrim 83 in the form of a circular plate of perforated metal. The several scrims, as well as the several filters, can be used interchangeably with the luminaire to provide desired lighting effects, and also with outer reflector 42, for maximum intensity.

Figure 9:
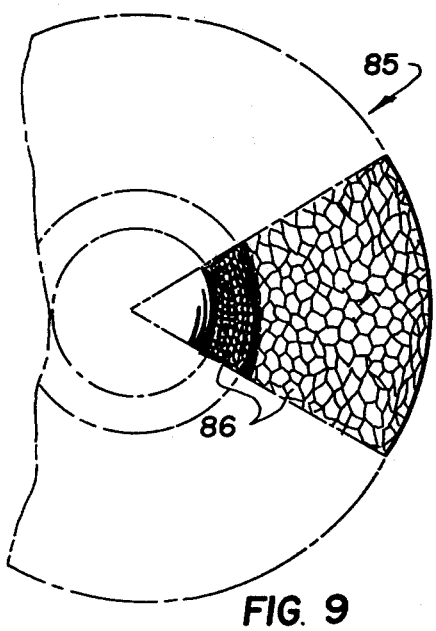
FIGS. 9 and 10 are partial elevation views of two different reflectors useable with the luminaires.

As previously mentioned, the reflector assembly 40 is interchangeable with other reflector assemblies. FIG. 9 illustrates a reflector assembly 85 interchangeable with reflector assembly 40 and having overall the same combination of inner and outer parabolic reflectors and the transition zone. The reflector shown in FIG. 9 is arranged to be used with 120 and 240 volt lamps, and has regular peening 86 on the transition zone and on the outer parabolic reflector.

Figure 10:
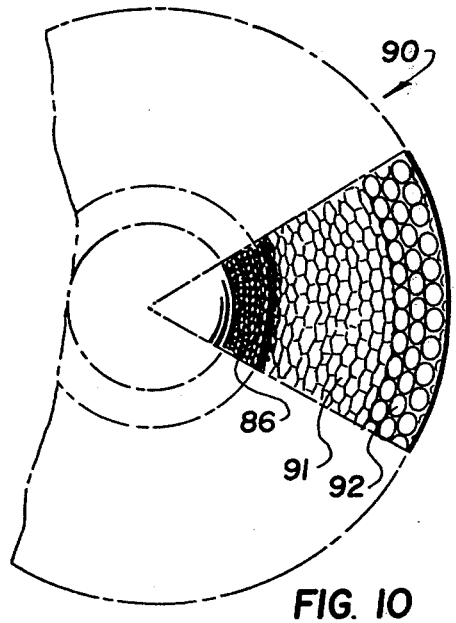

FIG. 10 shows another reflector assembly, interchangeable with the reflector assembly 40 and in the form of a reflector assembly for use with lamps operating at 30 volts. This reflector assembly 90 has regular peening on the transition zone, oval peening 91 on an intermediate portion of the outer parabolic reflector, and circular peening 92 on the extreme outer portion of the outer parabolic reflector.

A third reflector useable with the luminaire is generally the same as the reflector 85, but has a gold finish to provide a "warming" effect. In addition, another reflector may be used for a high intensity spot light with a long "throw". This reflector, as distinguished from the reflector assemblies already described, is a single parabolic reflector with an unpeened, specular surface.

With reflector assemblies involving a small diameter inner parabolic reflector, a transition zone, and a larger diameter outer parabolic reflector, there is obtained the best spot-to-flood ratio and the best smoothness in transition, the transition being practically imperceptible.

As previously mentioned, the luminaire is provided with a clamp by means of which it may be mounted upon a suitable support post. Referring to FIG. 11, a clamp 95 is mounted on the side wall 13 opposite to the side wall 13 which carries thereon the hand grip 15 and the operating knob 30. The clamp 95 is identical with the clamp or bracket 40 shown more particularly in FIG. 5 of U.S. Pat. No. 3,852,582, and is provided with a clamping knob 96 by means of which the bracket or clamp 95 may be clamped, for example, to a tripod post or the like generally indicated at 97. In the same manner as the bracket 40 of the U.S. Pat. No. 3,852,582, the clamp or bracket 95 may be used to mount additional accessories such as shown, for example, in FIGS. 10 and 11 of U.S. Pat. No. 3,852,582.

While specific embodiments of the invention have been shown and described in detail to illustrate the application of the principles of the invention, it will be understood that the invention may be embodied otherwise without departing from such principles.

What is claimed is:

1. A combined spot and flood light luminaire, for photographic work, arranged to be either held in one hand or mounted on a suitable support and to have photographic accessories mounted thereon, said luminaire comprising, in combination, a casing; a hand grip adjustably secured to said casing whereby said casing can be held in one hand of a user; a shaft rotatably mounted in said casing and projecting outwardly thereof; a handle secured to the projecting end of said shaft adjacent said hand grip for operation by the same hand gripping said hand grip; a lamp socket mounted on said shaft intermediate its ends; a lamp upright in said socket; a reflector assembly mounted in said casing and including a small diameter inner parabolic reflector, a large diameter outer parabolic reflector coaxial with said inner reflector, and a transition zone interconnecting said reflectors; said reflector assembly having a relatively elongated slot therein receiving said lamp socket for swinging of said upright lamp, about the axis of said shaft, by operation of said handle, between an inner position, in which said lamp, in cooperation with said inner parabolic reflector and also with said outer reflector, for maximum intensity, provides a broad or wide angle flood light, and an outer position, in which said lamp, in cooperation primarily with said outer reflector, provides a concentrated spot light; and mounting means on said casing for mounting said luminaire on a supporting post and for mounting of photographic accessories on said luminaire.

2. A combined spot and flood light luminaire, as claimed in claim 1, in which said casing is substantially square and includes at least one pair of substantially parallel side walls extending forwardly from a rear wall; said hand grip being adjustably secured to one side wall and said shaft extending outwardly through said one side wall.

3. A combined spot and flood light luminaire, as claimed in claim 2, in which said hand grip is pivotal against a side wall of said casing, when not in use.

4. A combined spot and flood light luminaire, as claimed in claim 2, including a large diameter operating knob secured to the end of said handle for operation by the thumb of a hand gripping said hand grip.

5. A combined spot and flood light luminaire, as claimed in claim 1, including a circular cross section reflector retainer mounted in said casing and having a diameter, at its outer end, somewhat greater than the distance beween said pair of side walls so that the circular outer end of said retainer projects outwardly beyond said side wall; said retainer being formed, adjacent its outer end, with a shoulder seating a rim on the outer end of said outer parabolic reflector, and said retainer also having a radially inwardly facing grooved peripheral rim at its extreme outer end; and a retainer ring seated in the grooved rim of said reflector retainer for releasably maintaining a reflector assembly mounted therein; said outwardly projecting rim of said reflector assembly retainer serving as a mounting means for photographic accessories.

6. A combined spot and flood light luminaire, as claimed in claim 5, including a substantially square barn door frame of relatively thin and resilient metal; said frame having four side walls each formed with a relatively elongated slot therein adjacent its inner edge; said slots being engageable over the peripheral rim of said reflector assembly retainer for mounting of said frame on said luminaire and rotation of said frame through 360°; and barn doors mounted on side walls of said barn door frame.

7. A combined spot and flood light luminaire, as claimed in claim 6, in which each side wall of said barn door frame has pivotally mounted thereon and extending longitudinally thereof a mounting bracket; and respective barn doors mounted on each mounting bracket, each barn door including three leaves pivotally interconnected to each other.

8. A combined spot and flood light luminaire, as claimed in claim 6, in which each of said barn door frame side walls is formed with slots extending inwardly from its inner edge to receive mounting means for photographic accessories.

9. A combined spot and flood light luminaire, as claimed in claim 2, in which said mounting means comprises a bracket pivoted to said rear wall of said casing and including a first arm extending radially from the pivot and a second arm extending at right angles from the free end of said first arm toward the front of said casing; said second arm, adjacent its free end, being formed as an apertured bracket for receiving mounting stems and arms of photographic accessories; and a clamping screw threaded into said bracket and operable to clamp an arm or stem therein.

10. A combined spot and flood light luminaire, as claimed in claim 2, in which said mounting means comprises a substantially tubular bracket pivotally mounted on that side wall of said casing opposite to the side wall mounting said hand grip; a clamping screw threaded into said tubular bracket; said tubular bracket serving to mount said luminaire on a post or the like and further serving to receive a mounting post for additional photographic accessories.

11. A combined spot and flood light luminaire, as claimed in claim 8, including a filter frame including a substantially square main wall having a circular aperture therein and having flanges projecting perpendicular to each of its edges; a pair of opposite flanges having a pair of relatively elongated slots therein mounting a pair of resilient arms; said resilient arms extending beyond the slotted flanges for engagement in said slots opening inwardly from the front edges of the walls of said barn door frame for mounting of said filter frame in said barn door frame.

12. A combined spot and flood light luminaire, as claimed in claim 11, including plural circular scrims interchangeably mountable in said filter frame.

* * * * *